(12) United States Patent
Kong et al.

(10) Patent No.: US 11,989,171 B2
(45) Date of Patent: May 21, 2024

(54) DATA STORAGE METHOD AND SYSTEM

(71) Applicant: Palantir Technologies Inc., Palo Alto, CA (US)

(72) Inventors: Jeremy Kong, London (GB); Grgur Petric Maretic, London (GB); Gokcan Ozakdag, London (GB); James Baker, London (GB); Sandor Van Wassenhove, London (GB); Thomas Petracca, New York, NY (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 17/521,481

(22) Filed: Nov. 8, 2021

(65) Prior Publication Data

US 2022/0207025 A1 Jun. 30, 2022

Related U.S. Application Data

(63) Continuation of application No. 16/402,700, filed on May 3, 2019, now Pat. No. 11,169,987.

(30) Foreign Application Priority Data

Oct. 16, 2018 (GB) ..................................... 1816808

(51) Int. Cl.
G06F 7/00 (2006.01)
G06F 16/22 (2019.01)
G06F 16/23 (2019.01)
G06F 16/27 (2019.01)

(52) U.S. Cl.
CPC ........ *G06F 16/2379* (2019.01); *G06F 16/221* (2019.01); *G06F 16/278* (2019.01)

(58) Field of Classification Search
CPC .. G06F 16/221; G06F 16/278; G06F 16/2379; G06F 16/27; G06F 16/2322
USPC ................ 707/703, 741, 755, 737, 769, 968
See application file for complete search history.

(56) References Cited

U.S. PATENT DOCUMENTS

2010/0211618 A1* 8/2010 Anderson ........... G06F 16/2474
707/812
2017/0300391 A1* 10/2017 Namburi ............. G06F 11/1471

* cited by examiner

Primary Examiner — Md I Uddin
(74) Attorney, Agent, or Firm — McAndrews, Held & Malloy, Ltd.

(57) ABSTRACT

An apparatus and method are disclosed. The method, which may be performed by one or more processors, may comprise receiving timestamp data representing a plurality of database transactions and dividing the timestamp data into a plurality of partitioning quanta (nPQ), each partitioning quantum (PQ) of the plurality of partitioning quanta representing a range of timestamps. Further, for each partitioning quantum (PQ) of the plurality of partitioning quanta (nPQ), the method may comprise allocating the timestamp data, such that sequentially adjacent timestamps are allocated to different partitions of a physical storage system for subsequent storage at the allocated partitions.

15 Claims, 8 Drawing Sheets

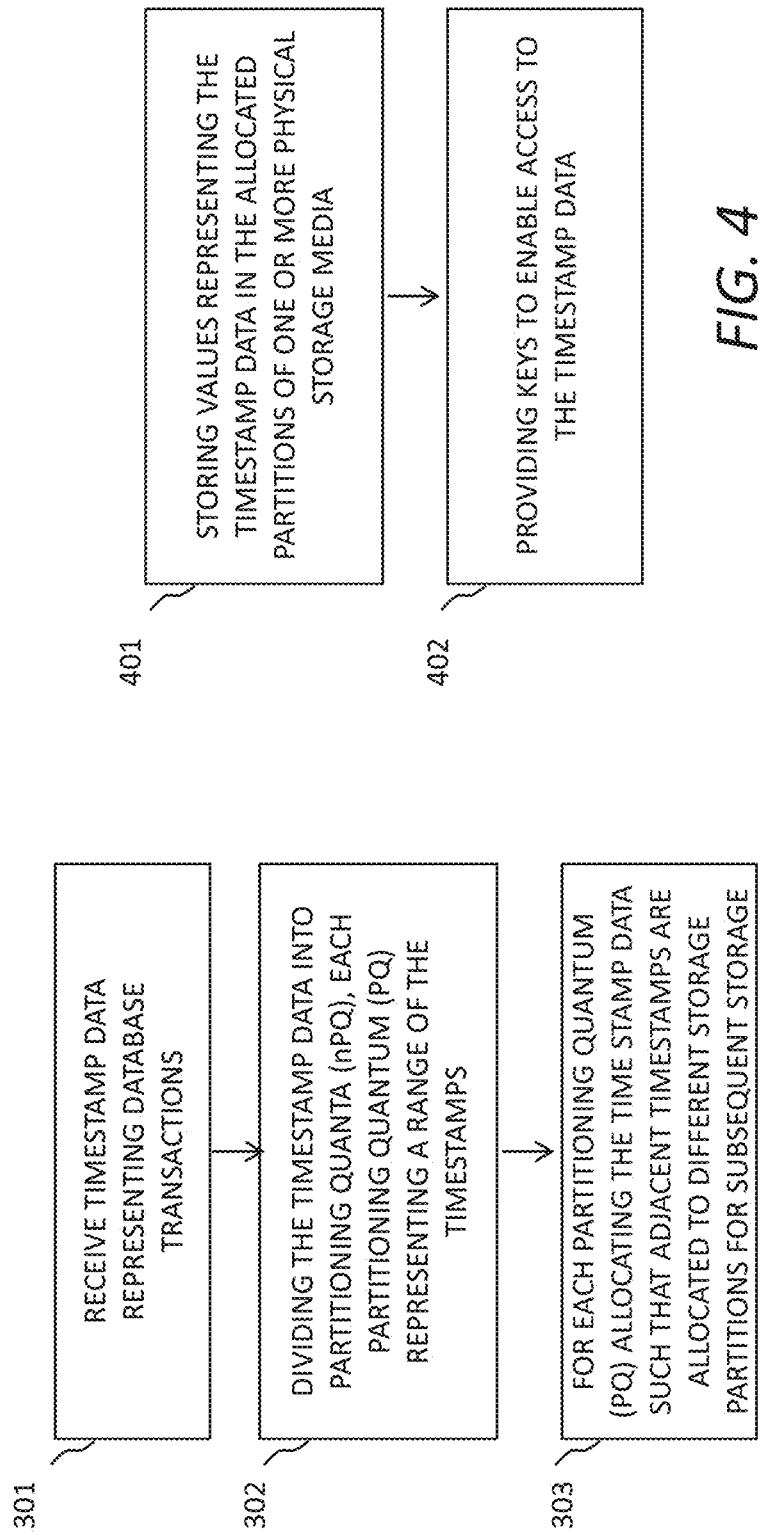

DATA STORAGE METHOD AND SYSTEM

CROSS-REFERENCE TO RELATED APPLICATIONS

This application is a continuation of U.S. application Ser. No. 16/402,700, filed May 3, 2019, which is a national phase application of UK Application No. 1816808.8, filed Oct. 16, 2018, the entirety of both of which are hereby incorporated by reference in their entireties for all purposes.

TECHNICAL FIELD

Example embodiments relate to methods and systems for data storage.

BACKGROUND

A database is an organized collection of data which is stored and may be accessed electronically. Databases are used in virtually every commercial sector to store, organise and manage data relating to, for example, technical processes, data analysis and transformation processes, financial transactions and inventory management, to give a very limited number of examples.

Databases may be classified based on how they store data and/or how they are managed. Example classifications which are well-known are relational databases and non-relational (e.g. NoSQL) databases. Non-relational databases tend to be the preferred class where scalability and distribution of database storage nodes on multiple computer systems is needed. Such scalability and provision of distributed storage are factors that many modern database users require, particularly where databases hold large amounts of data which increase over time.

Another feature that modern database users require is transactional functionality. A transactional database is one that has the capability to roll-back or undo a requested database transaction if it is not completed correctly. There is usually logged a start timestamp, indicating when a transaction starts (e.g. a write operation), and, if there are no errors, an associated commit timestamp, indicating when the transaction has occurred (e.g. the write operation has succeeded). This enables transactions to be rolled-back if an error occurs, and the relevant operation does not persist to the database.

Transactions may be represented through a transactions data structure, e.g. a table, which acts as a source of truth as to whether the transaction has been committed or not, and may also enable transactions across the boundaries of column families and across partition keys. The table may be written to atomically. Timestamp data does not necessarily comprise clock data; in embodiments herein, and in general, timestamp data can be any data representing a number, e.g. a sequentially incrementing number for subsequent transactions. Hence, transactions close together may take up a similar portion of byte space, e.g. be within the same partition which may refer to a memory or disk partition, the same database cluster, the same machine, etc. This may result in congestion and performance degradation, e.g. if lots of simultaneous reads and writes are being made to the same partition. This situation may be referred to as hot-spotting.

SUMMARY

According to one aspect, there is provided a method, performed by one or more processors, the method comprising:

receiving timestamp data representing a plurality of database transactions;

dividing the timestamp data into a plurality of partitioning quanta (nPQ), each partitioning quantum (PQ) of the partitioning quanta representing a range of timestamps; and for each partitioning quantum (PQ) of the plurality of partitioning quanta (nPQ), allocating the timestamp data, such that sequentially adjacent timestamps are allocated to different partitions of a physical storage system for subsequent storage at the allocated partitions.

The method may further comprise: storing values representing the timestamp data, or data associated with the timestamp data, in the allocated partitions of one or more physical storage media; and providing keys to enable access to the timestamp data, or data derived from the timestamp data, for access by means of a database management system.

The timestamps within a range may be sequential timestamps.

The allocating may comprise defining a plurality of partitions (NP) over which the timestamp data for each partitioning quantum (PQ) is to be allocated, wherein the number of partitions is less than the number of timestamps within each partitioning quantum (PQ).

The allocating may comprise generating a data structure for each partitioning quantum (PQ) comprising N rows and M columns, each of the N rows corresponding to a respective one of the partitions (NP) and each of the M columns corresponding to a subset range of timestamps within each partitioning quantum (PQ), each of the N rows and M columns having respective row and column keys to enable access to the timestamp data.

The row keys may be represented using little endian binary format.

The row keys may be provided as:

LITTLE_ENDIAN((Ts/PQ)*NP+(Ts % PQ) % NP), where LITTLE_ENDIAN means little endian binary format, Ts is a timestamp value and % means modulus.

The column keys may be provided as:

((Ts % PQ)/NP), where Ts is a timestamp value and % means modulus.

The row and/or column keys may be encoded using variable-length encoding.

The provided timestamp data may represent database transaction start times (Ts).

The values allocated to the respective partitions of the one or more physical storage media may represent database transaction commit times (Tc) corresponding to the same transaction as the database transaction start times (Ts).

The values allocated to the respective partitions of the one or more physical storage media may represent the difference between database transaction commit time (Tc) and the database transaction start time (Ts).

The values may be encoded using variable-length encoding.

Another aspect provides a computer program, optionally stored on a non-transitory computer readable medium program which, when executed by one or more processors of a data processing apparatus, causes the data processing apparatus to carry out a method according to any preceding definition.

Another aspect provides an apparatus configured to carry out a method according to any preceding method definition, the apparatus comprising one or more processors or special-purpose computing hardware.

BRIEF DESCRIPTION OF DRAWINGS

Example embodiments will now be described, by way of non-limiting example, with reference to the accompanying drawings, in which:

FIG. 3 is a flow diagram showing example processing operations for allocating timestamp data, according to some example embodiments;

FIG. 4 is a flow diagram showing example processing operations for storing values representing timestamp data and providing keys, according to some example embodiments;

FIG. 6 is a generalised flow diagram of logical to physical encoding in accordance with some example embodiments, showing how the row key and column keys are arrived at;

DETAILED DESCRIPTION

Figure 1:
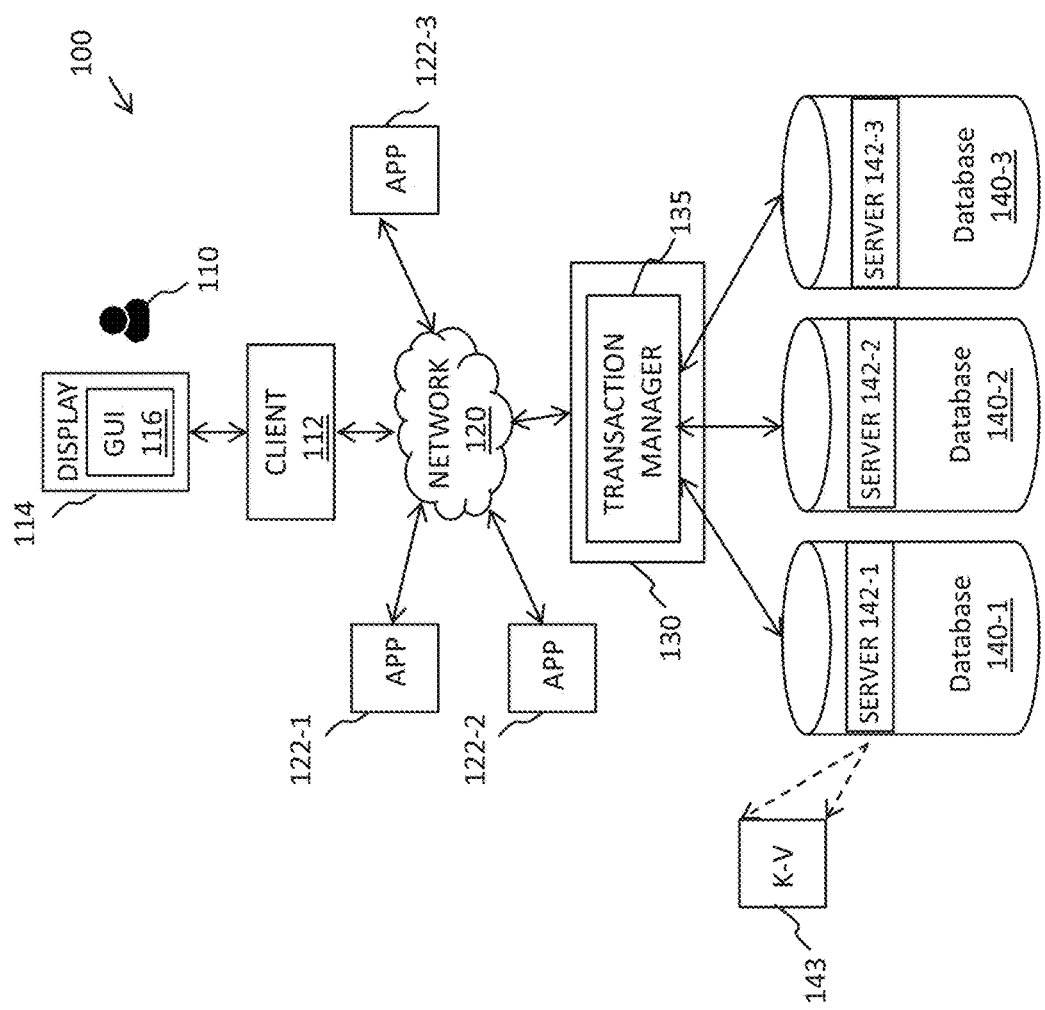
FIG. 1 is a block diagram of a computer system including a network, a transaction manager and one or more databases.

Example embodiments will be described for carrying out the subject matter of the present disclosure. In the following description, specific details are set forth in order to provide a thorough understanding of the subject matter. It shall be appreciated that embodiments may be practiced without some or all of these specific details.

Example embodiments relate to methods and systems for data storage, particularly in the context of databases. In this context, a database is any organized collection of data which is stored and may be accessed electronically. This accessing may be achieved by means of a computer instruction comprising for example a query derived from a client which may relate to one or more of reading, writing, transforming or managing data.

Example embodiments particularly relate to database management, whereby methods and systems control how such queries are processed as above in an efficient manner. Example embodiments of this database management relate to a scalable, transactional database architecture which may be implemented on one or more computer systems, i.e. using a distributed model. However, other embodiments are not limited to this form of database model.

Example embodiments may provide a database management method and system that interacts with a transactions data structure, which may be a table or some other data structure, which provides a source of truth as to whether or not transactions have been committed or not. A conventional method is to provide a relatively simply transactions table having a single variable length encoded 64 bit integer (hereafter VAR_LONG) row component for start timestamps and a single column which stores the commit timestamp (if successful), also as a VAR_LONG value. Timestamps are not necessarily indicative of a clock time, but may comprise increasing numbers, whether incremental or otherwise. This, and VAR_LONG encoding of the timestamps, means that timestamps which are relatively close together have similar high-order bytes. So, write queries that take place relatively close together will have start timestamps at around the same number and hence will be allocated and stored within the same or similar portion of byte-space. This results in so-called hot spotting. An advantage of certain example embodiments is to reduce or avoid hot spotting and therefore increase efficiency.

We refer herein to partitions, and it will be appreciated that partitions may refer to physically distinct portions of memory, such as different partitions on a hard disk drive, or on solid state memory, or physically different memory devices, or even physically different and remote locations, e.g. different network storage nodes or clusters.

Example embodiments may provide a database management method and system that interacts with a transactional layer, being a hardware and/or software module that provides transactions, supporting the rolling-back or undoing of transactions if not completed appropriately, and in particular interacts with a transactional table or other similar data structure.

Example Computer System

FIG. 1 illustrates an example of a computer system 100 configured to perform method and systems described herein. As shown, the computer system 100 includes a client computing device 112 used by a human user 110, a server 130 and one or more memory devices that may provide individual databases 140 1, 140-2, 140-3 or a distributed database. The client computing device 112 and the server 130 may be configured to communicate with one another via a network 120. The network 120 may include the Internet, an intranet, a local area network, a wide area network, a wired network, a wireless network, and a virtual private network (VPN). For ease of understanding, various components of the system have each been described with reference to one or more computing devices. It should be noted that, in same embodiments, any number of these components may be collocated on the same computing device.

The client computing device 112 may for instance be a laptop computer, a desktop computer, a mobile phone, a personal digital assistant (PDA), a tablet computer, a netbook, a television with one or more processors, embedded therein or coupled thereto, a physical machine or a virtual machine. The client computing device 112 may include one or more of a keyboard, a mouse, a display 114, or a touch screen (of which display 114 may be a part of). For example, the client computing device 112 may be composed of hardware components like those of a basic computing device 700 described below with respect to FIG. 9. The client computing device 112 may also include a web browser or a client application configured to display, in a graphical user interface 116 of the client computing device 112, a computer program for accessing data. It may also allow the user to specify other operations that should be performed by the server 130. The graphical user interface 116 may be a web browser window, a client application window, an operating system window, an integrated development environment window, a virtual terminal window or other computer graphical user interface window. While only one user 110 and one client computing device 112 are illustrated in FIG. 1, the subject innovations may be implemented in conjunction with one or more users 110 and one or more client computing devices 112.

The server 130 may be implemented as a single server computing device or as multiple server computing devices arranged in a distributed or clustered computing arrangement. Each such server computing device may be composed of hardware components like those of basic computing device 700 described below with respect to FIG. 9. The server 130 includes a transaction manager 135 which may be an application, script or other executable file the operation of which will be described later on. In some embodiments, other software modules may be provided on the server 130.

The server 130 may include one or more processors (e.g. CPUs), a network interface, and memory. The processor(s) may be configured to execute computer instructions that are stored in one or more computer-readable media, for example, the memory of the server 130. The server 130 may include a network interface that is configured to allow the server 130 to transmit and receive data in a network, e.g., network 120 of FIG. 1. The network interface may include one or more network interface cards (NICs). The memory of the server 130 may store data or instructions. The instructions stored in the memory may include the transaction manager 135.

One or more applications 122-1, 122-2, 122-3, may be connected to the network 120 for performing one or more functions associated with data in the databases 140-1, 140-2, 140-3. The one or more applications 122-1, 122-2, 122-3, may be microservices, or similar applications dedicated to a particular service or services associated with database data, and users may utilise said applications via a client and network to interact with the database data in a flexible and useful way.

For example, a first application 122-1 may be configured for performing user authentication and authorisation. A second application 122-2 may be configured for performing data integration for one or more of sourcing, fusing and transforming data in the one or more databases 140-1, 140-2, 140-3 into a required format. A third microservice 122-3 may be configured for performing a further database-related task. The user 110 wishing to perform some task or query on data in the one or more databases 140-1, 140-2, 140-3 may utilise the first to third applications 122-1, 122-2, 122-3. This use may be restricted to particular users, for example by initially requiring tasks or queries to use the first application 122-1 for user authentication and authorization, prior to enabling use of the other applications 122-2, 122-3.

The transaction manager 135 is configured to manage transactions. A transaction is a unit of work, i.e. one or more of an update, read, deletion, transformation and write operation, to be performed by a data management system in response to user requests. The data contained in a transaction may correspond to a portion of a data object, a single data object or a plurality of data objects. For example, the data management system may be a system comprising the server 130 and the one or more databases 140-1, 140-2, 140-3. While the one or more individual databases 140-1, 140-2, 140-3 can provide transactions, using the transaction manager 135 enables transactions to be implemented across a distributed database system which is provided over plural machines or locations.

Transactions enable roll-back, or recovery or undoing, from failures by ensuring that the data management system is kept consistent when failures occur. Transactions also ensure the data management system is kept consistent when multiple programs attempt to access the data management system simultaneously. This is achieved by four properties of transactions known as ACID: Atomicity, Consistency, Isolation and Durability.

Atomicity refers to transactions being "all-or-nothing", or atomic, meaning that a transaction either completely succeeds or fails. If a transaction succeeds, all operations included in the transaction are completed. If a transaction fails, no visible change is made to the data management system, so it appears to external systems, such as the client computing device 112, accessing the system after the transaction has failed that no operation has been attempted. Transaction failure may occur for a number of reasons, e.g. power failure, faulty code or application failure.

Consistency refers to (successful) transactions only changing data stored by the data management system in allowed ways. The allowed ways that the database can change may be constrained by any number of primary key constraints, data type constraints, foreign key constraints, unique constraints and assertion statements. If a transaction results in a state that violates any of these constraints, the transaction is not successful and results in a transaction failure, so it is as if no operation has been attempted.

Isolation refers to work taking place inside a transaction being invisible to other operations, i.e. other transactions, running concurrently. This property ensures data is only seen in a consistent state, i.e. before or after a transaction has completed. Without isolation, data read by a second transaction while a first transaction was underway would be incorrect. For example, the first transaction may represent a bank transfer and so increment one bank balance then decrement another bank balance. If a second transaction was able to read these bank balances half-way through the first transaction, the first bank balance would be incremented but the second bank balance would not yet be decremented. It would, therefore, appear to the second transaction that money had appeared from nowhere. Isolation prevents these scenarios from occurring.

Durability refers to all successful transactions being permanently stored, i.e. stored in non-volatile memory, e.g. to a hard disk drive or solid state drive. The transaction is not considered successful until this has occurred, and if this is prevented from occurring, e.g. by a disk failure, the transaction is deemed to have failed, and no visible change is made to the data management system.

Each of the one or more databases 140-1, 140-2, 140-3 may include one or more processors (e.g., CPUs), a network interface, and memory. The processor(s) may be configured to execute computer instructions that are stored in one or more computer-readable media, for example, a memory of each database. The databases 140-1, 140-2, 140-3 may each include a network interface configured to allow each database 140-1, 140-2, 140-3 to transmit and receive data in one or more networks, e.g., a network connecting the server 130 and the databases, which may be the same or different network as the network that connects the server 130 and the client computing device 112. The network interface may include one or more network interface cards (NICs). The memory of each database 140-1, 140-2, 140-3 may store data or instructions. The instructions stored in each memory may include a database server module 142-1, 142-2, 142-3.

While three databases 140-1, 140-2, 140-3 are shown, any number of databases and database server modules may be used 142-1, 142-2, 142-3.

The database servers 142-1, 142-2, 142-3 may be any database serving application capable of providing reliable storage. In many embodiments, the database servers 142-1, 142-2, 142-3 are the same database serving application, but this is not essential provided all can be accessed and managed by the transaction manager 135. One or more of the database servers 142-1, 142-2, 142-3 may be a key-value store 143, such as CassandraDB, Oracle NoSQL or LevelDB. One or more of the database servers 142-1, 142-2, 142-3 may be a document-oriented database, such as MongoDB or CouchDB. One or more of the database servers 142 may be a Structured Query Language (SQL) database such as Oracle® database, MySQL database, PostgreSQL database or Microsoft® SQL server.

In many embodiments, the database servers 142-1, 142-2, 142-3 are distributed database serving applications, e.g. CassandraDB or MongoDB. This is not as essential as distributed data management may be provided by the transaction manger 135. However, using a distributed database serving application enables fault tolerance and/or horizontal scalability, and the transaction manager 135 need only provide the distributed transaction functionality.

Figure 2:
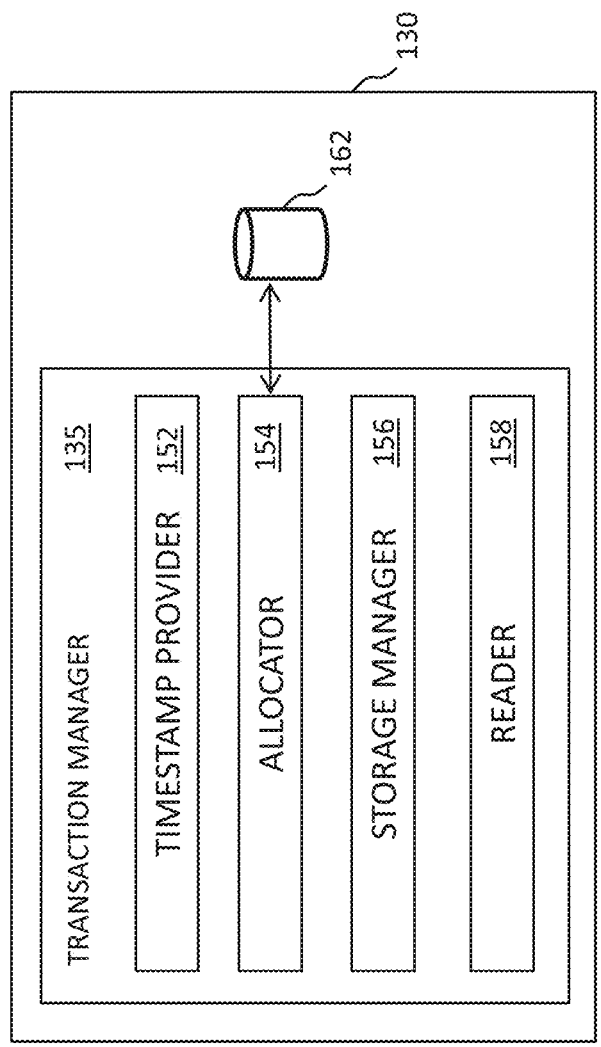
FIG. 2 is a functional block diagram of the FIG. 1 transaction manager, according to some example embodiments.

FIG. 2 is a schematic diagram of the transaction manager 135 provided on the server 130. The transaction manager 135 may be an application, script or other executable file. The transaction manager 135 comprises modules including a timestamp provider 152, an allocator module 154, a storage module 156 and reader module 158. It will be appreciated that two or more modules may be provided as a combined application, script or executable file.

Transactions are typically coordinated via one or more timestamps. The timestamp provider 152 provides timestamps. In some embodiments, timestamp provider 152 provides two timestamps—one corresponding to a start timestamp (Ts) and one corresponding to a commit timestamp (Tc), assuming the relevant transaction is successful. The provided timestamp may be an increasing number, so that a first timestamp may be 1 and a second timestamp may be 2 and so on, although the numbers need not be sequential and may comprise binary numbers having an arbitrary number of bits. The number of bits may be chosen in line with the architecture of the server 130 being deployed. In some embodiments, binary numbers comprising 64 bits are chosen. A commit timestamp (Tc) will have a higher number than its corresponding start timestamp (Ts) for obvious reasons. In some embodiments, timestamps Ts may come from an external source of timestamps.

The allocator module 154 allocates or maps timestamps to a data structure 162 in accordance with example embodiments to be explained below. The data structure is created according to a schema for allocating timestamps, and embodiments herein relate to how the schema allocates timestamps to provide certain technical advantages. For example, the allocation is for the purpose of enabling distribution of the timestamps across different partitions to avoid hot spotting, but which also comprises other features providing further advantages.

The storage manager module 156 stores a value representing timestamps in the appropriate partition of physical memory corresponding to the distribution allocation in the data structure 162. The physical memory may be one or more of the databases 142-1, 142-2, 142-3 or another memory.

The reader module 158 handles the reading of timestamps from the appropriate partitions of physical memory, i.e. to determine the commit timestamp (Tc), if present, and what it is (if required).

FIG. 3 is a flow diagram illustrating example operations that may be performed at the allocator module 154 of the transaction manager 135 in accordance with example embodiments. Some operations may be omitted and some other operations may be added. The numbering of operations is not necessarily indicative of the order of processing.

A first operation 301 comprises receiving timestamp data representing respective database transactions.

Another operation 302 comprises dividing the timestamp data into a plurality of partitioning quanta (nPQ), each partitioning quantum (PQ) representing a range of timestamps.

Another operation 303 comprises, for each partitioning quantum (PQ), allocating the timestamp data such that adjacent timestamps are allocated to different storage partitions for subsequent storage.

FIG. 4 is a flow diagram illustrating example operations that may be performed at the storage manager module 156 of the transaction manager 135 in accordance with example embodiments. Some operations may be omitted and some other operations may be added. The numbering of operations is not necessarily indicative of the order of processing.

A first operation 401 comprises storing values representing the timestamp data in the allocated partitions of one or more physical storage media.

Another operation 402 comprises providing keys to enable access to the timestamp data.

In this respect, it is useful to consider an example. We first introduce some definitions:

PQ may refer a partitioning quantum, which is a potentially large number of timestamps to be distributed over a group of partitions; and NP may refer to the number of partitions over which a single partitioning quantum (PQ) distributes its timestamps.

A function of the allocator module 154 is to allocate the first PQ timestamps across partitions zero to NP−1, the next PQ timestamps across partitions NP to 2NP−1 and so on.

The intuition here is that within a PQ, timestamps are allocated in alternation across NP partitions; for example, adjacent timestamps (in terms of numerical order) may be allocated to different partitions). So, using an example data structure 162 in the form of a table having n rows and m columns, timestamps 0, NP, 2NP, 3NP may go to row 0, timestamps 1, NP+1, 2NP+1 etc. may go to row 1, and so on.

Figure 5:
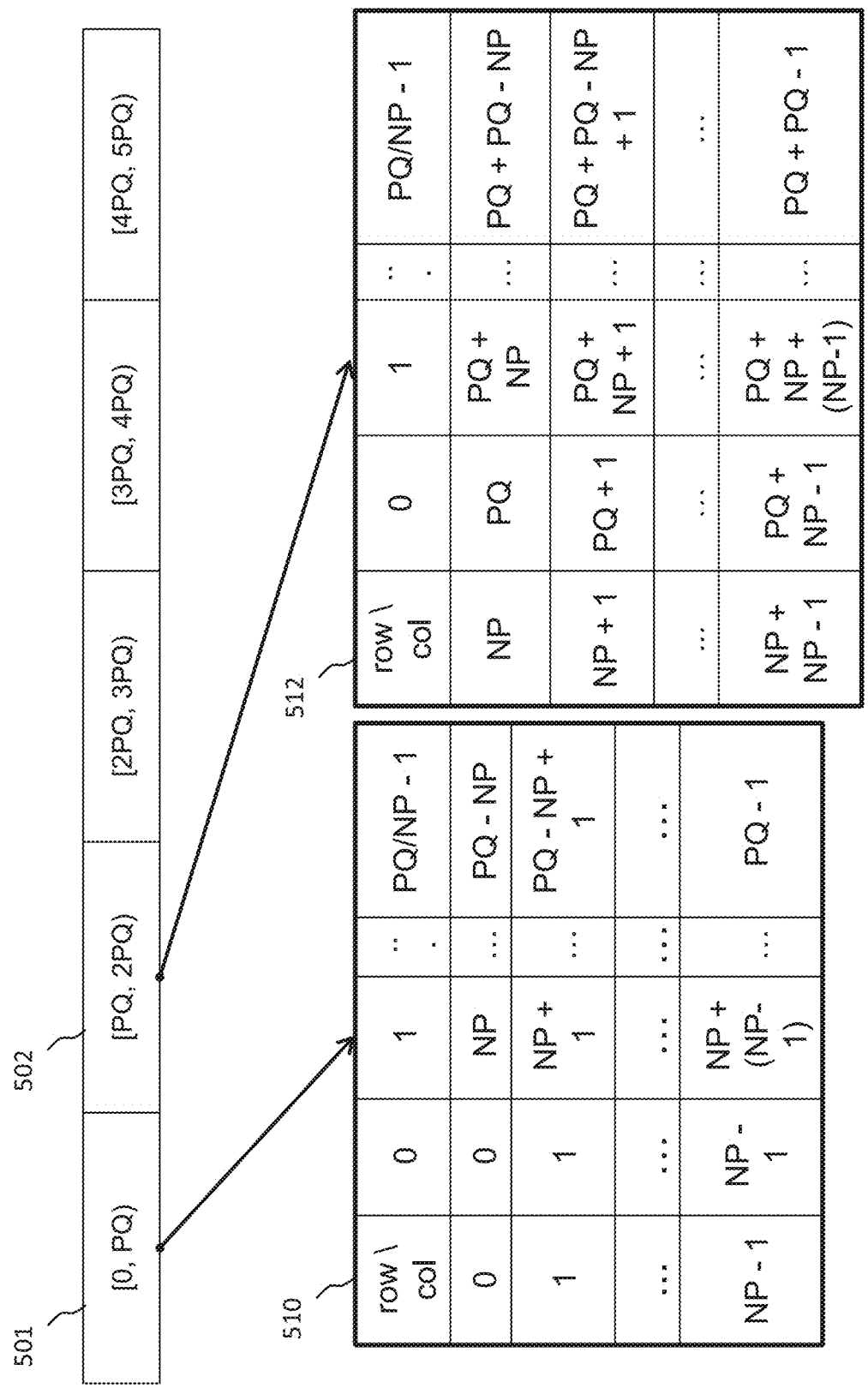
FIG. 5 is a schematic diagram showing how, for the range of timestamps in a partitioning quantum, a table 510 may be generated representing the allocation of timestamps, according to some example embodiments.

FIG. 5 is a graphical example of how, for the range of timestamps in a PQ (i.e. [0, PQ] 501) a table 510 may be generated representing the allocation of timestamps. Each row n may represent a different partition and each column a range of timestamps. So, each column may correspond to, e.g. 0 to NP timestamps, NP+1 to 2NP timestamps, 2NP+1 to 3NP timestamps and so on. This is useful for range scans; columns may be encoded using simple variable longs, and NP is a relatively small number in practice, meaning that a whole column can be loaded at a time when performing range scans. This may also be useful for some embodiments of the data structure 162, where row size may face soft or hard limits, or maintaining rows of an inappropriate size may incur performance penalties.

Similarly, FIG. 5 also shows the allocation of timestamps for a different PQ ([PQ, 2PQ] 502) in a further table 512.

The tables 510, 512 and any further tables for the other nPQs are comprised in the data structure 162.

The storage manager module 156 therefore may store timestamps at a partition corresponding to their allocated row, and at an offset corresponding to their allocated column. In this way, hot spotting is reduced or avoided, because time-ordered timestamps are stored in different partitions.

Figure 6:
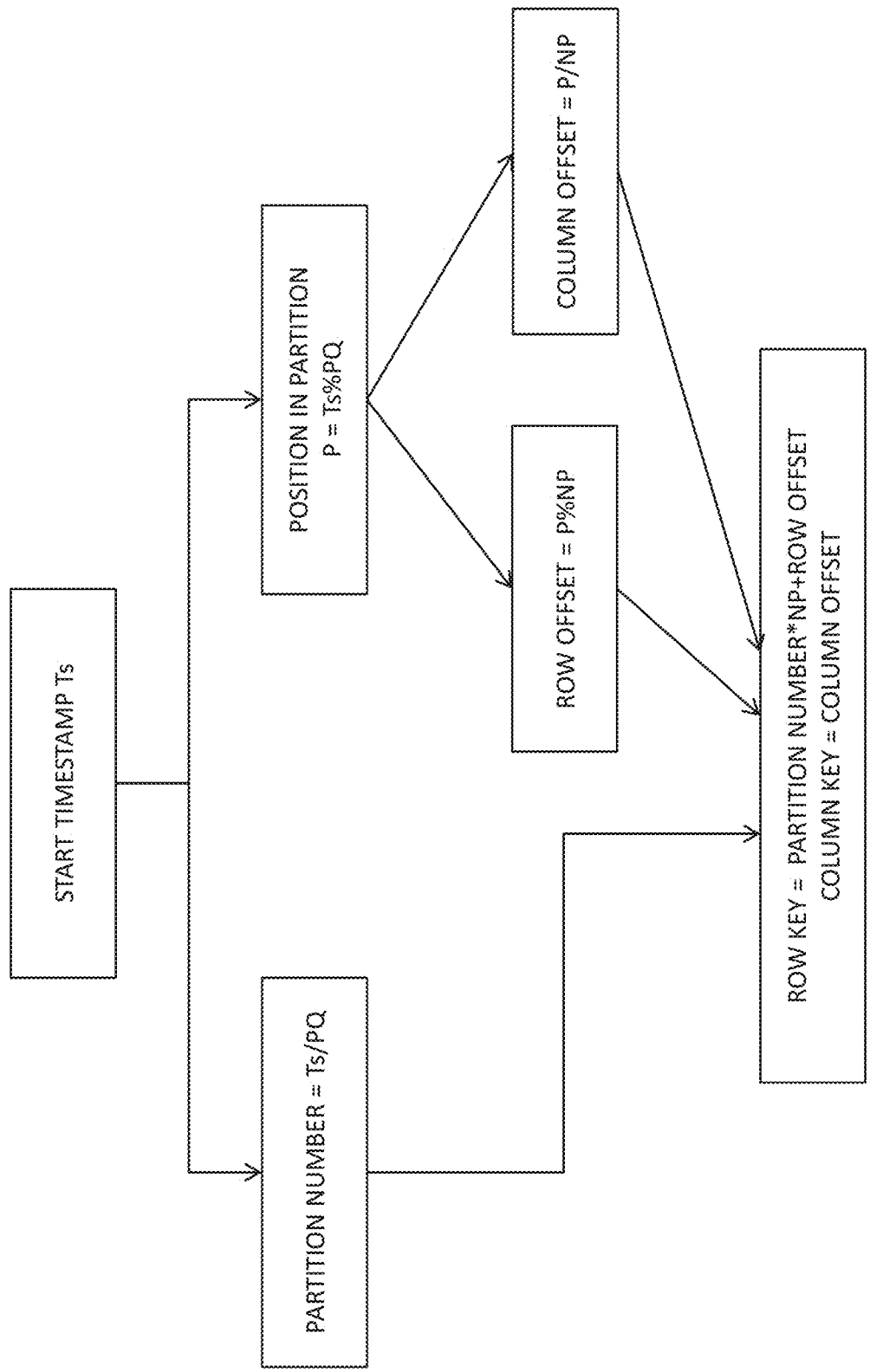

In some embodiments, a given (Ts, Tc) allocation or mapping may be according to the following keys, for which also see FIG. 6.

Row Key: LITTLE_ENDIAN((Ts/PQ)*NP+(Ts % PQ) % NP)

Dynamic Column Key: ((Ts % PQ)/NP)

where % is the modulus operator and/or denotes integer division.

In some embodiments, variable length (VAR_LONG) coding may be performed to make the above:

Row Key: VAR_LONG_LITTLE_ENDIAN((Ts/PQ) *NP+(Ts % PQ) % NP)

Dynamic Column Key: VAR_LONG((Ts % PQ)/NP)

where % is the modulus operator and/denotes integer division.

By using little endian coding of the row key, the allocations to different partitions are effectively spread further apart. For example, if the number of bits for a row number is 5, then the first three row (partition) numbers would be converted from {0, 1, 2, 3} to {0, 16, 8, 24} providing further distribution. Using little endian coding will ensure the distribution is much more diverse; using VAR_LONG encoding saves space as smaller numbers use fewer bytes.

| Row Number (Partition) | Big Endian | Little Endian | Back Converted Row Number |
|---|---|---|---|
| 0 | 00000 | 00000 | 0 |
| 1 | 00001 | 10000 | 16 |
| 2 | 00010 | 01000 | 8 |
| 3 | 00011 | 11000 | 24 |

Further still, the value that is stored in the appropriate cell of each table can be the commit timestamp Tc or it can be a smaller number, for example:

Value: (Tc−Ts).

In this way, storage space is minimised because VAR_LONG encodings of numbers take up far less storage space if the numbers are smaller.

To provide a further example, consider the following logical to physical encoding example where PQ is set as 1,000,000 and NP set to 100.

For a start timestamp Ts=3,141,592, and corresponding commit timestamp Tc=3,141,603, following the above equations:

Row Key: 3*NP+92;

ColumnKey: 1,415.

Value: 11.

FIG. 6 is a generalised flow diagram of logical to physical encoding in accordance with some example embodiments, showing how the row key and column keys are arrived at.

As mentioned previously, as well as advantages in terms of reducing or avoiding hot spotting, and the reduced data burden of storing smaller values based on Tc−Ts, embodiments herein are useful for range scans; columns may be encoded using simple variable longs, and NP is a relatively small number in practice, meaning that a whole column can be loaded at a time when performing range scans.

Figure 7A:
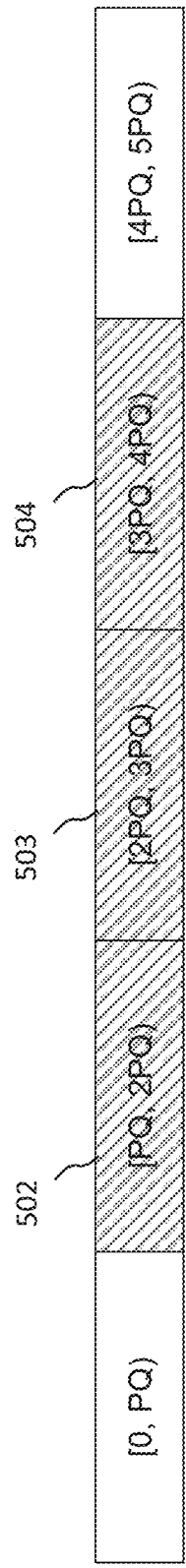
FIG. 7A is a schematic diagram showing how partitioning quanta may be located in a range scan operation, according to some example embodiments.
Figure 7B:
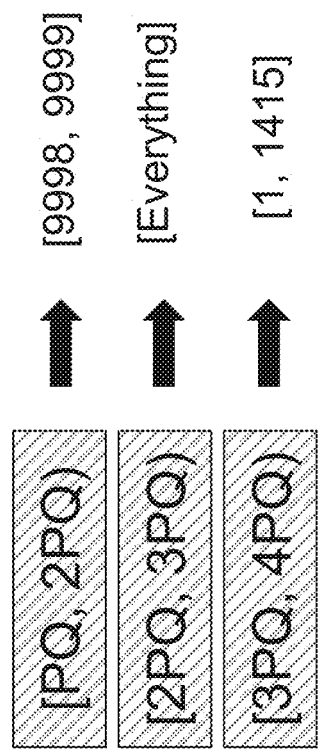
FIG. 7B is a schematic diagram showing how relevant columns may be obtained based on the FIG. 7A range scan operation, according to some example embodiments.

Consider the example shown in FIGS. 7A and 7B, which is based on the above example where PQ is set as 1,000,000 and NP set to 100. A range scan between timestamps 1,999,832 and 3,141,592 is required. This is passed to the reader module 158 of the transaction manager 135.

First, referring to FIG. 7A, relevant PQs are located by reversing the above operations, which are shown as the PQs 502, 503, 504.

Then, referring to FIG. 7B, for each PQ 502, 503, 504, we get all relevant columns across all NP rows. From PQ 502, we receive columns 9998 and 9999 which contain timestamps 1,999,800 to 1,999,999. From PQ 503, we receive everything present in this partitioning quantum, i.e. timestamps 2,000,000 to 2,999,999. From PQ 504, we receive columns 1 to 1415, which contain timestamps 3,000,000 to 3,141,599.

Then, we can recover the start timestamps, because the functions are invertible, and possibly post-filtering.

Finally, we can recover the commit timestamps by adding the delta, i.e. the values to the start timestamps.

Example embodiments therefore may provide a schema that offers the following technical advantages. For example, in terms of avoiding hot spotting, timestamps that are numerically close together are allocated to different partitions, bearing in mind that timestamps that are used tend to be numerically close together. For example, the storage space used for storing transactions, which can be considerable, is reduced by storing values in accordance with the methods described. The schema also supports range queries for timestamp intervals which scale within the range actually being queried, rather than having to read the entire table.

Typically, for NP, a value of 16 may be reasonable, as one would not want excessively large values of NP, as they may limit the extent to which disk usage is cut and consume a lot of timestamps. Too small a value of NP may affect concurrency. However, variations in the value of NP may be found on an application-by-application basis with testing. The value of PQ may be selected to ensure that dynamic column rows do not grow too large, because all columns from the same partition may be stored on the same set of replicas. Typically 10 MB may be used as a bound, but others may be determined on an application-by-application basis.

In some embodiments of the data structure 162, concurrent updates to the same row may suffer degraded performance. Although an individual transaction manager 135 may batch its updates to avoid such concurrency, this becomes difficult if multiple servers 130 run in parallel with the same underlying data structure 162.

To avoid aforementioned degraded performance, one seeks to avoid such concurrent updates as far as possible. Solutions may include each individual server pre-selecting a value or plurality of values between 0 and NP−1 (inclusive), and then rejecting timestamps that do not match one of these values % NP (where % is the modulo operator). Servers will repeatedly acquire timestamps from the timestamp provider 152 until an acceptable timestamp is obtained.

Figure 8:
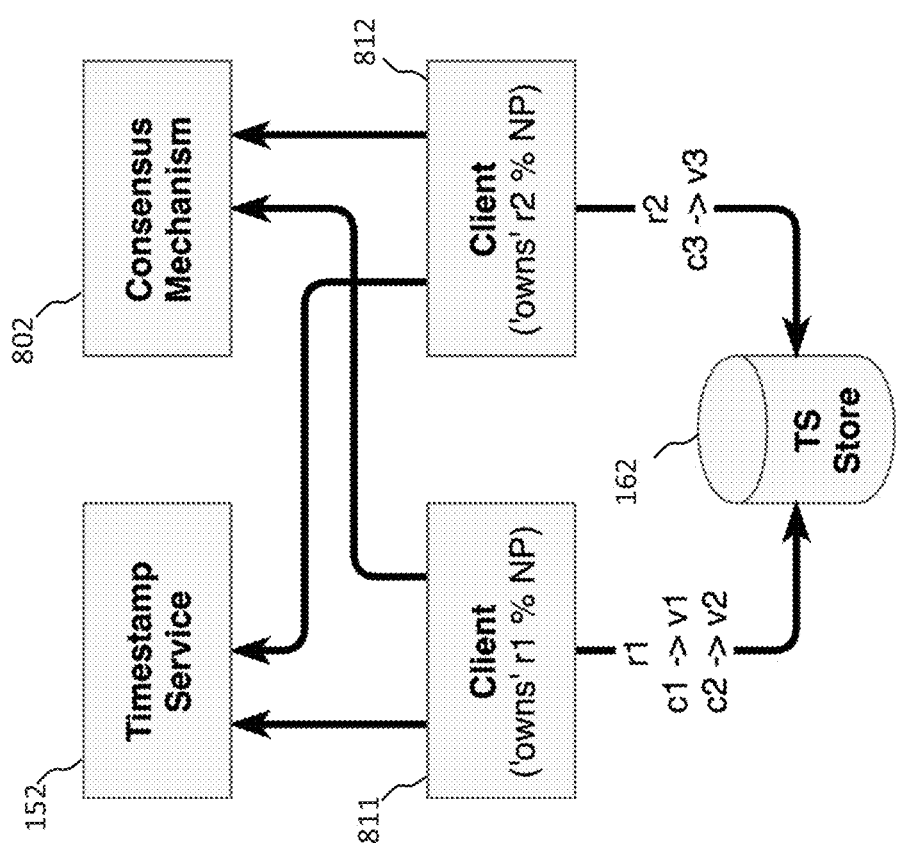
FIG. 8 is a flow diagram useful for understanding batching and consensus, according to some example embodiments.

Alternatively, consider FIG. 8. Two clients 811 and 812 are operating with the same data structure 162. The clients may employ a consensus mechanism 802 to collectively determine a plurality of values between 0 and NP−1 (inclusive) that each individual client 'owns' and should use. The consensus mechanism 802 may also coordinate with the timestamp provider 152 to only hand out suitable timestamps if clients identify themselves appropriately when requesting timestamps.

For example, where NP=16, the consensus mechanism may decide that client 811 'owns' odd numbers and client 812 'owns' even numbers. Then, if client 811 makes a request to the timestamp provider 152 and identifies it as client 811, the timestamp service can ensure that timestamps it returns will be odd. In particular, if the timestamp service is to give out sequential numbers and the next available timestamp is 76, it will skip ahead and return 77.

This is beneficial relative to unilateral pre-selection of values as it can better ensure that conflicts are avoided; although conflicts are less likely with unilateral selection, there remains a risk that they may occur. Furthermore, with this method timestamps may remain denser in low numbers, which is beneficial given numbers with smaller numerical value encoded using VAR_LONG encoding require less space.

In some embodiments, the consensus mechanism 802 may use Paxos, Raft or other distributed consensus algorithms to agree on the values suitable for each client. In some embodiments, the mechanism may elect a single leader that decides this.

In some embodiments, the timestamp provider 152 may re-order pending requests so that the last timestamp given out after a sequence of requests remains as small as possible. For example, suppose we have client 811 'owning' odd numbers and client 812 'owning' even numbers. If the timestamp provider 152 is to give out sequential numbers and the next available timestamp is 80, and client 811 makes two requests and client 812 makes one request shortly after, the timestamp service may decide to respond to client 812's request first.

Example Computing Device

Figure 9:
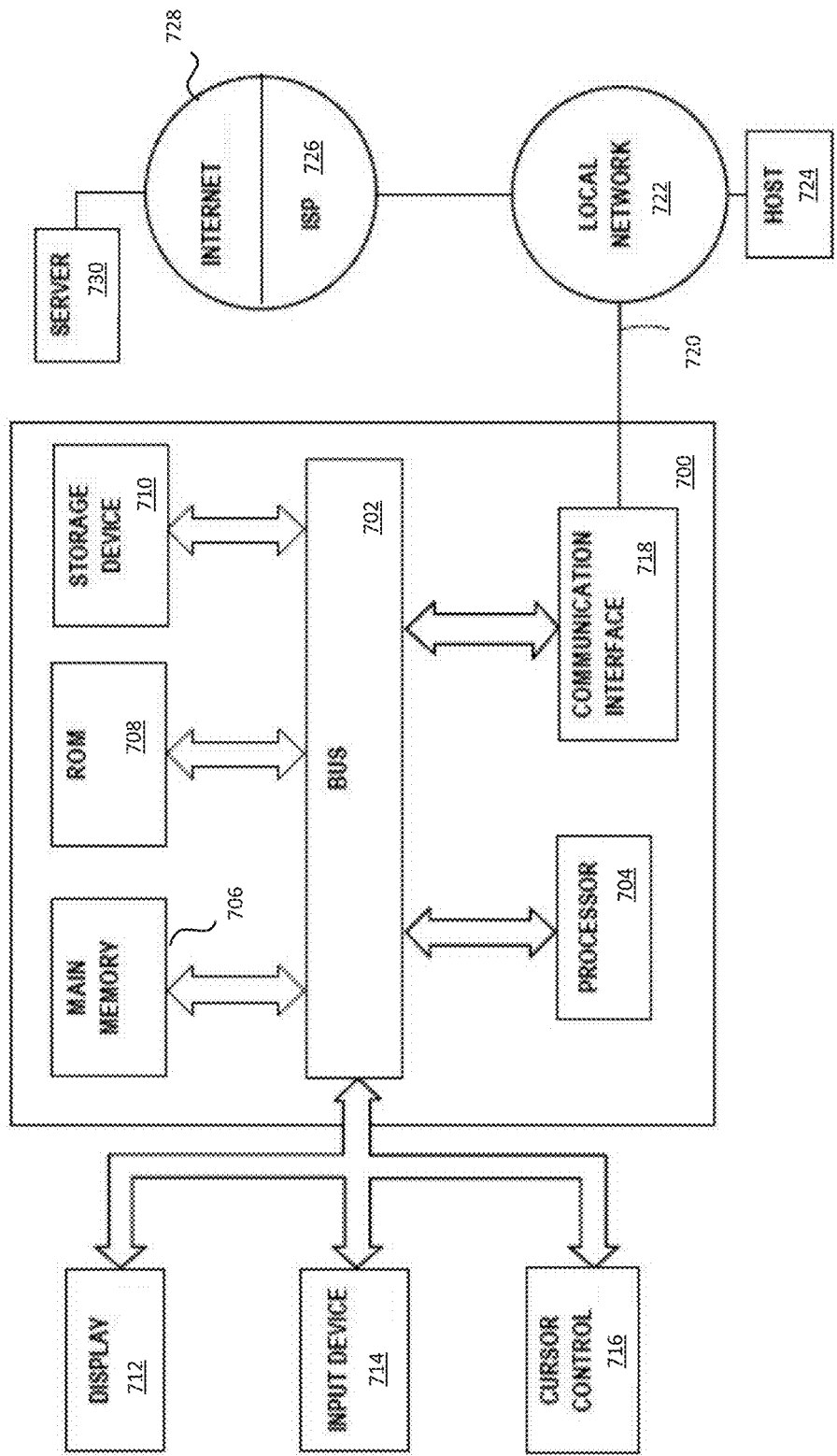
FIG. 9 is a block diagram of a computer system according to embodiments of this specification.

Referring now to FIG. 9, it is a block diagram that illustrates a computing device 700 in which software-implemented processes of the subject innovations may be embodied. Computing device 700 and its components, including their connections, relationships, and functions, is meant to be exemplary only, and not meant to limit implementations of the subject innovations. Other computing devices suitable for implementing the subject innovations may have different components, including components with different connections, relationships, and functions.

Computing device 700 may include a bus 702 or other communication mechanism for addressing main memory 706 and for transferring data between and among the various components of device 700.

Computing device 700 may also include one or more hardware processors 704 coupled with bus 702 for processing information. A hardware processor 704 may be a general purpose microprocessor, a system on a chip (SoC), or other processor suitable for implementing the subject innovations.

Main memory 706, such as a random access memory (RAM) or other dynamic storage device, also may be coupled to bus 702 for storing information and instructions to be executed by processor(s) 704. Main memory 706 also may be used for storing temporary variables or other intermediate information during execution of software instructions to be executed by processor(s) 704.

Such software instructions, when stored in non-transitory storage media accessible to processor(s) 704, render computing device 700 into a special-purpose computing device that is customized to perform the operations specified in the instructions. The terms "instructions", "software", "software instructions", "program", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 700 also may include read only memory (ROM) 708 or other static storage device coupled to bus 702 for storing static information and instructions for processor(s) 704.

One or more mass storage devices 710 may be coupled to bus 702 for persistently storing information and instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 710 (e.g., the main hard disk for the device) stores a body of program and data for directing operation of the computing device, including an operating system, user application programs, driver and other support files, as well as other data files of all sorts.

Computing device 700 may be coupled via bus 702 to display 712, such as a liquid crystal display (LCD) or other electronic visual display, for displaying information to a computer user. In some configurations, a touch sensitive surface incorporating touch detection technology (e.g., resistive, capacitive, etc.) may be overlaid on display 712 to form a touch sensitive display for communicating touch gesture (e.g., finger or stylus) input to processor(s) 704.

An input device 714, including alphanumeric and other keys, may be coupled to bus 702 for communicating information and command selections to processor 704. In addition to or instead of alphanumeric and other keys, input device 714 may include one or more physical buttons or switches such as, for example, a power (on/off) button, a "home" button, volume control buttons, or the like.

Another type of user input device may be a cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

While in some configurations, such as the configuration depicted in FIG. 9, one or more of display 712, input device 714, and cursor control 716 are external components (i.e., peripheral devices) of computing device 700, some or all of display 712, input device 714, and cursor control 716 are integrated as part of the form factor of computing device 700 in other configurations.

Functions of the disclosed systems, methods, and modules may be performed by computing device 700 in response to processor(s) 704 executing one or more programs of software instructions contained in main memory 706. Such instructions may be read into main memory 706 from another storage medium, such as storage device(s) 710. Execution of the software program instructions contained in main memory 706 cause processor(s) 704 to perform the functions of the disclosed systems, methods, and modules.

While in some implementations, functions of the disclosed systems and methods are implemented entirely with software instructions, hard-wired or programmable circuitry of computing device 700 (e.g., an ASIC, a FPGA, or the like) may be used in place of or in combination with software instructions to perform the functions, according to the requirements of the particular implementation at hand.

The term "storage media" as used herein refers to any non-transitory media that store data and/or instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor(s) 704 for execution. For example, the instructions may initially be carried on a magnetic disk or solid-state drive of a remote computer. The remote computer can load the instructions into its dynamic memory and send the instructions over a telephone line using a modem. A modem local to computing device 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor(s) 704 retrieves and executes the instructions. The instructions received by main memory 706 may optionally be stored on storage device(s) 710 either before or after execution by processor(s) 704.

Computing device 700 also may include one or more communication interface(s) 718 coupled to bus 702. A communication interface 718 provides a two-way data communication coupling to a wired or wireless network link 720 that is connected to a local network 722 (e.g., Ethernet network, Wireless Local Area Network, cellular phone network, Bluetooth wireless network, or the like). Communication interface 718 sends and receives electrical, electromagnetic, or optical signals that carry digital data streams representing various types of information. For example, communication interface 718 may be a wired network interface card, a wireless network interface card with an integrated radio antenna, or a modem (e.g., ISDN, DSL, or cable modem).

Network link(s) 720 typically provide data communication through one or more networks to other data devices. For example, a network link 720 may provide a connection through a local network 722 to a host computer 724 or to data equipment operated by an Internet Service Provider (ISP) 726. ISP 726 in turn provides data communication services through the world wide packet data communication network now commonly referred to as the "Internet" 728. Local network(s) 722 and Internet 728 use electrical, electromagnetic or optical signals that carry digital data streams. The signals through the various networks and the signals on network link(s) 720 and through communication interface(s) 718, which carry the digital data to and from computing device 700, are example forms of transmission media.

Computing device 700 can send messages and receive data, including program code, through the network(s), network link(s) 720 and communication interface(s) 718. In the Internet example, a server 730 might transmit a requested code for an application program through Internet 728, ISP 726, local network(s) 722 and communication interface(s) 718.

The received code may be executed by processor 704 as it is received, and/or stored in storage device 710, or other non-volatile storage for later execution.

The above-described example computer hardware is presented for the purpose of illustrating certain underlying computer components that may be employed for implementing the subject innovations. This computer hardware, when executing software that causes the computer hardware to perform the various processes discussed herein, becomes a special purpose computer that performs particular useful applications.

The subject innovations, however, are not necessarily limited to any particular computing environment or computing device configuration. Instead, the subject innovations may be implemented in any type of system architecture or processing environment that one skilled in the art, in light of this disclosure, would understand as capable of supporting the features and functions of the subject innovations as presented herein.

Extensions and Alternatives

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Unless specifically stated otherwise, the term "may" is used to express one or more non-limiting possibilities. Headings and subheadings, if any, are used for convenience only and do not limit the subject innovations.

A phrase, for example, an "aspect", an "embodiment", a "configuration", or an "implementation" does not imply that the aspect, the embodiment, the configuration, or the implementation is essential to the subject innovations or that the aspect, the embodiment, the configuration, or the implementation applies to all aspects, embodiments, configurations, or implementations of the subject innovations. A disclosure relating to an aspect, an embodiment, a configuration, or an implementation may apply to all aspects, embodiments, configurations, or implementations, or one or more aspects, embodiments, configurations, or implementations. A phrase, for example, an aspect, an embodiment, a configuration, or an implementation may refer to one or more aspects, embodiments, configurations, or implementations and vice versa.

The invention claimed is:

1. A method, performed by one or more processors, the method comprising:
receiving timestamp data representing transaction start times of each of a plurality of database transactions;
dividing the timestamp data into a plurality of partitioning quanta (nPQ), each partitioning quantum (PQ) of the plurality of partitioning quanta representing a range of sequential start timestamps; and
for each partitioning quantum (PQ) of the plurality of partitioning quanta (nPQ), allocating the timestamp data, such that sequentially adjacent start timestamps are allocated to different partitions of one or more physical storage systems for subsequent storage at the allocated partitions, wherein the different partitions are physically distinct partitions on a hard drive or solid state memory or physically different memory devices;
storing values representing the timestamp data, or data associated with the timestamp data, in the allocated partitions of the one or more physical storage systems, wherein the allocating comprises generating a data structure for each partitioning quantum (PQ) comprising N rows and M columns, each of the N rows corresponding to a respective one of the partitions (NP) and each of the M columns corresponding to a subset range of timestamps within each partitioning quantum (PQ), each of the N rows and M columns having respective row and column keys to enable access to the timestamp data;
receiving a range scan query corresponding to a range of the timestamp data;
locating relevant PQs from the plurality of partitioning quanta (nPQ) for the range of the timestamp data;
for each PQ of the relevant PQs, loading all relevant columns across all NP rows by determining column keys for the one or more PQs, wherein the column keys correspond to the range of the timestamp data; and
obtaining the timestamp data, or the data derived from the timestamp data, from the column keys,
wherein the row or column keys are encoded using variable-length encoding, and
wherein the values allocated to the respective partitions of the one or more physical storage media represent database transaction commit times (Tc) corresponding to the same transaction as the database transaction start times (Ts).

2. The method of claim 1, wherein the values allocated to the respective partitions of the one or more physical storage media represent a difference between database transaction commit time (Tc) and the database transaction start time (Ts).

3. The method of claim 1, wherein the values are encoded using variable-length encoding.

4. The method of claim 1, wherein the allocating comprises defining a plurality of partitions (NP) over which the timestamp data for each partitioning quantum (PQ) is to be allocated, wherein a number of partitions is less than a number of timestamps within each partitioning quantum (PQ).

5. The method of claim 1, wherein the row keys are represented using little endian binary format.

6. The method of claim 1, wherein the row keys are provided as:

LITTLE_ENDIAN((Ts/PQ)*NP+(Ts % PQ) % NP), where LITTLE_ENDIAN means little endian binary format, Ts is a timestamp value and % means modulus.

7. The method of claim 1, wherein the column keys are provided as:

((Ts % PQ)/NP), where Ts is a timestamp value and % means modulus.

8. A computer program, optionally stored on a non-transitory computer readable medium program which, when executed by one or more processors of a data processing apparatus, causes the data processing apparatus to carry out a method comprising:
receiving timestamp data representing transaction start times of each of a plurality of database transactions;
dividing the timestamp data into a plurality of partitioning quanta (nPQ), each partitioning quantum (PQ) of the plurality of partitioning quanta representing a range of sequential start timestamps; and
for each partitioning quantum (PQ) of the plurality of partitioning quanta (nPQ), allocating the timestamp data, such that sequentially adjacent start timestamps are allocated to different partitions of one or more physical storage systems for subsequent storage at the allocated partitions, wherein the different partitions are physically distinct partitions on a hard drive or solid state memory or physically different memory devices;
storing values representing the timestamp data, or data associated with the timestamp data, in the allocated partitions of the one or more physical storage systems, wherein the allocating comprises generating a data structure for each partitioning quantum (PQ) comprising N rows and M columns, each of the N rows corresponding to a respective one of the partitions (NP) and each of the M columns corresponding to a subset range of timestamps within each partitioning quantum (PQ), each of the N rows and M columns having respective row and column keys to enable access to the timestamp data;
receiving a range scan query corresponding to a range of the timestamp data;
locating relevant PQs from the plurality of partitioning quanta (nPQ) for the range of the timestamp data;
for each PQ of the relevant PQs, loading all relevant columns across all NP rows by determining column keys for the one or more PQs, wherein the column keys correspond to the range of the timestamp data; and
obtaining the timestamp data, or the data derived from the timestamp data, from the column keys
wherein the row and column keys are encoded using variable-length encoding, and
wherein the values allocated to the respective partitions of the one or more physical storage media represent database transaction commit times (Tc) corresponding to the same transaction as the database transaction start times (Ts), or
wherein the values allocated to the respective partitions of the one or more physical storage media represent a difference between database transaction commit time (Tc) and the database transaction start time (Ts).

9. Apparatus comprising one or more processors or special-purpose computing hardware, the apparatus configured to carry out a method comprising:

receiving timestamp data representing transaction start times of each of a plurality of database transactions;

dividing the timestamp data into a plurality of partitioning quanta (nPQ), each partitioning quantum (PQ) of the plurality of partitioning quanta representing a range of sequential start timestamps;

for each partitioning quantum (PQ) of the plurality of partitioning quanta (nPQ), allocating the timestamp data, such that sequentially adjacent timestamps are allocated to different partitions of one or more physical storage system for subsequent storage at the allocated partitions, wherein the different partitions are physically distinct partitions on a hard drive or solid state memory or physically different memory devices;

storing values representing the timestamp data, or data associated with the timestamp data, in the allocated partitions of one or more physical storage systems, wherein the allocating comprises generating a data structure for each partitioning quantum (PQ) comprising N rows and M columns, each of the N rows corresponding to a respective one of the partitions (NP) and each of the M columns corresponding to a subset range of timestamps within each partitioning quantum (PQ), each of the N rows and M columns having respective row and column keys to enable access to the timestamp data;

receiving a range scan query corresponding to a range of the timestamp data;

locating relevant PQs from the plurality of partitioning quanta (nPQ) for the range of the timestamp data;

for each PQ of the relevant PQs, loading all relevant columns across all NP rows by determining column keys for the one or more PQs, wherein the column keys correspond to the range of the timestamp data; and obtaining the timestamp data, or the data derived from the timestamp data, from the column keys wherein the row or column keys are encoded using variable-length encoding, and wherein the values allocated to the respective partitions of the one or more physical storage media represent a difference between database transaction commit time (Tc) and the database transaction start time (Ts).

10. The apparatus of claim 9, wherein the values allocated to the respective partitions of the one or more physical storage media represent database transaction commit times (Tc) corresponding to the same transaction as the database transaction start times (Ts).

11. The apparatus of claim 10, wherein the values are encoded using variable-length encoding.

12. The apparatus of claim 9, wherein the allocating comprises defining a plurality of partitions (NP) over which the timestamp data for each partitioning quantum (PQ) is to be allocated, wherein a number of partitions is less than a number of timestamps within each partitioning quantum (PQ).

13. The apparatus of claim 9, wherein the row keys are represented using little endian binary format.

14. The apparatus of claim 9, wherein the row keys are provided as:

LITTLE_ENDIAN((Ts/PQ)*NP+(Ts % PQ) % NP), where LITTLE_ENDIAN means little endian binary format, Ts is a timestamp value and % means modulus.

15. The apparatus of claim 9, wherein the column keys are provided as:

((Ts % PQ)/NP), where Ts is a timestamp value and % means modulus.

* * * * *